(12) United States Patent
Jarasson et al.

(10) Patent No.: US 8,220,105 B2
(45) Date of Patent: Jul. 17, 2012

(54) WINDSCREEN WIPER BLADE COMPRISING A SUPPORT FRAME, AN INNER SPINE AND A LINKING ELEMENT

(75) Inventors: Jean-Michel Jarasson, Elancourt (FR);
Eric Poton, Pont du Chateau (FR);
Guiseppe Grasso, Le Breuil sur Couze (FR)

(73) Assignee: Valeo Systèmes d'Essuyage, La Verrière (FR)

( * ) Notice: Subject to any disclaimer, the term of this patent is extended or adjusted under 35 U.S.C. 154(b) by 1015 days.

(21) Appl. No.: 11/547,593

(22) PCT Filed: Mar. 30, 2005

(86) PCT No.: PCT/EP2005/003316
§ 371 (c)(1),
(2), (4) Date: Oct. 2, 2008

(87) PCT Pub. No.: WO2005/108176
PCT Pub. Date: Nov. 17, 2005

(65) Prior Publication Data
US 2009/0056049 A1    Mar. 5, 2009

(30) Foreign Application Priority Data
Apr. 6, 2004 (FR) .................... 04 03616

(51) Int. Cl.
*B60S 1/38* (2006.01)
(52) U.S. Cl. .............. 15/250.32; 15/250.201; 15/250.43
(58) Field of Classification Search ............. 15/250.361, 15/250.43, 250.44, 250.32, 250.201
See application file for complete search history.

(56) References Cited

U.S. PATENT DOCUMENTS

| | | | | |
|---|---|---|---|---|
| 5,661,871 A | * | 9/1997 | Scorsiroli | ................ 15/250.452 |
| 6,112,365 A | * | 9/2000 | Ullrich et al. | ............ 15/250.454 |
| 6,161,248 A | | 12/2000 | Reiss et al. | |

FOREIGN PATENT DOCUMENTS

| | | |
|---|---|---|
| DE | 196 41 042 | 4/1998 |
| DE | 198 01 058 | 7/1999 |
| DE | 198 35 065 | 2/2000 |
| EP | 1 119 478 | 8/2001 |
| WO | WO-00/21811 | 4/2000 |

OTHER PUBLICATIONS

International Search Report for PCT/EP2005/003316 dated Jun. 15, 2005 (2 pages).

* cited by examiner

*Primary Examiner* — Gary Graham
(74) *Attorney, Agent, or Firm* — Osha Liang LLP

(57) ABSTRACT

The invention provides a windscreen wiper blade (10) for a motor vehicle, comprising
a support frame (12) which comprises a longitudinal tubular body (18);
a structural element (14) in the form of a longitudinal horizontal strip, which is accommodated inside the tubular body (18); and
an element (16) for linking the blade (10) with a drive arm, which is mounted on the support frame (12), and the linking element (16) being installed on the support frame (12) by means of two lateral vertical longitudinal tabs (34),
characterized in that the lateral tabs (34) comprise lugs (40) that cooperate with recesses (42) made in the lateral edges (14*a*) of the structural element (14), to provide the blocking of the structural element (14) in the tubular body (18).

16 Claims, 3 Drawing Sheets

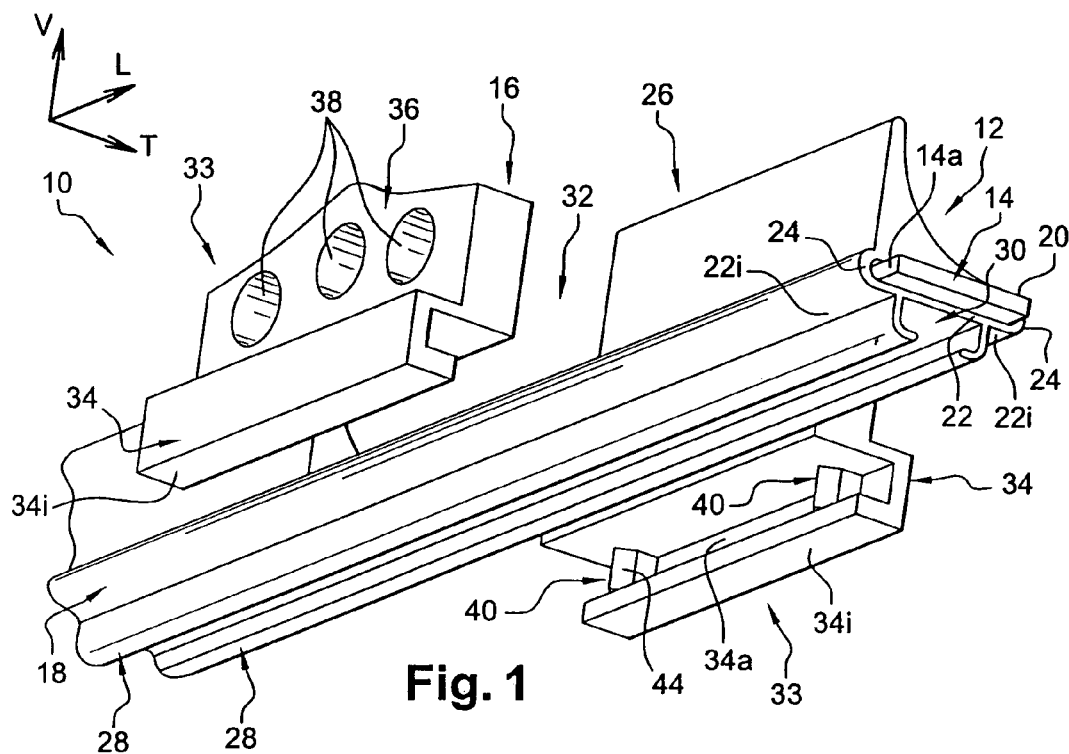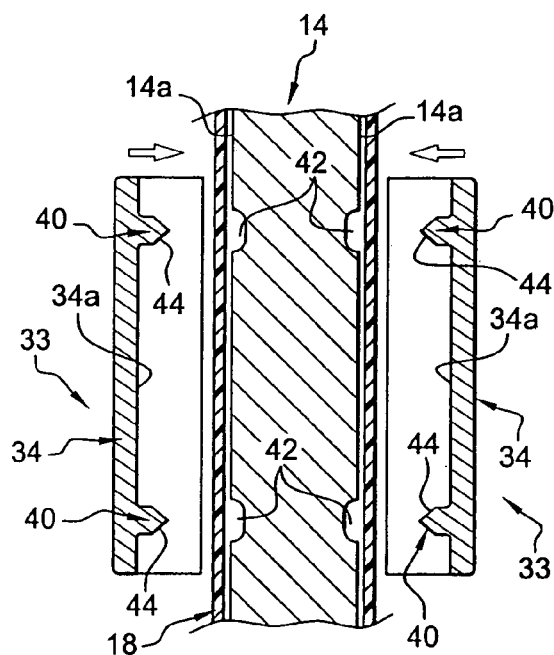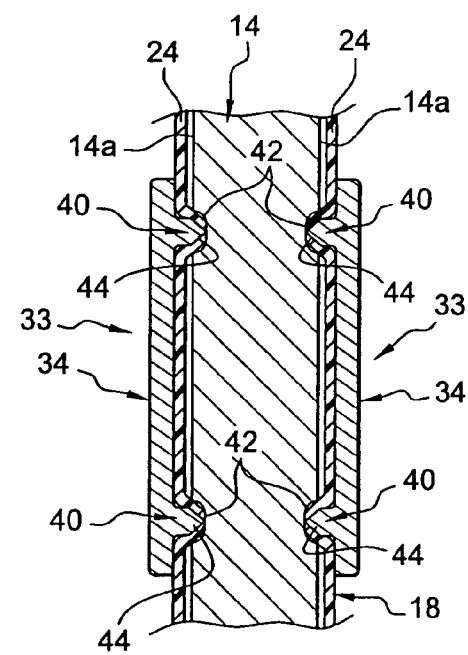

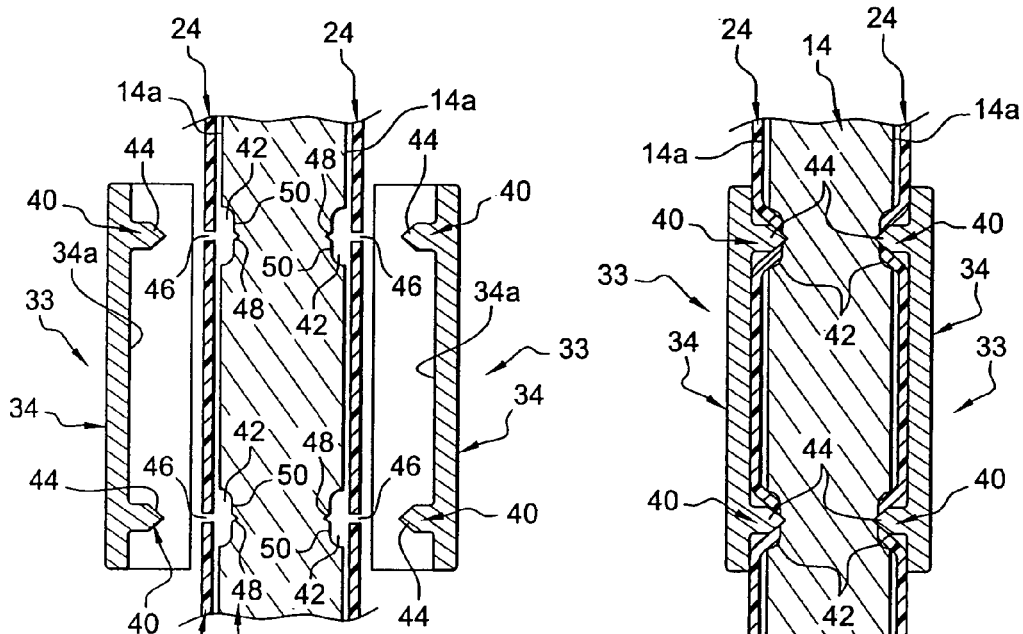
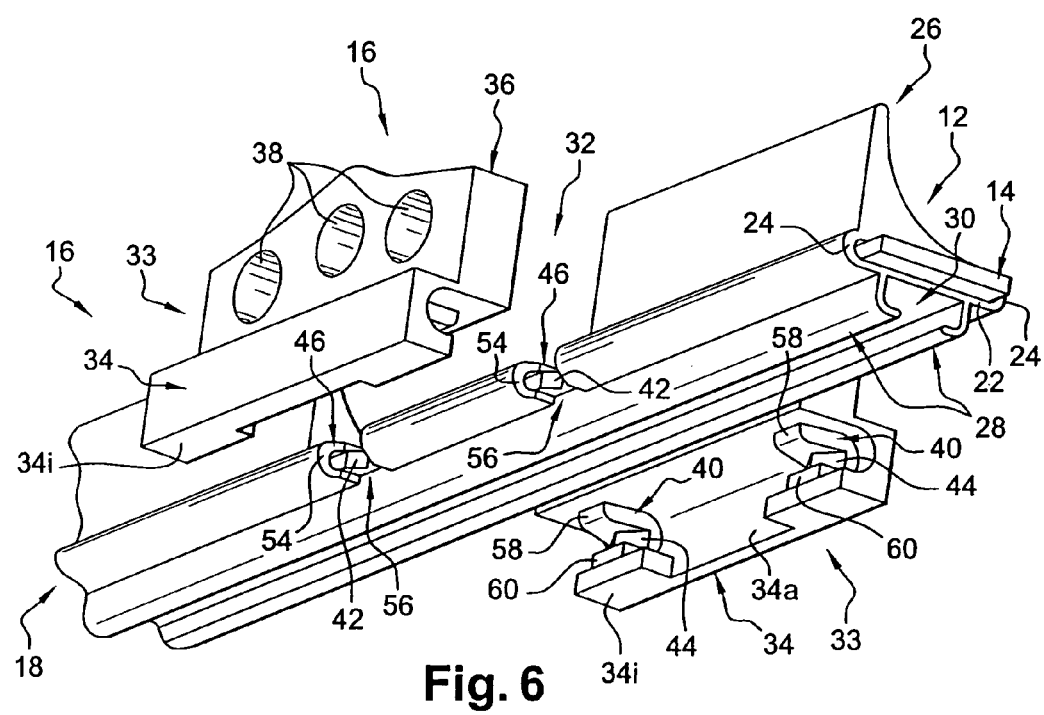

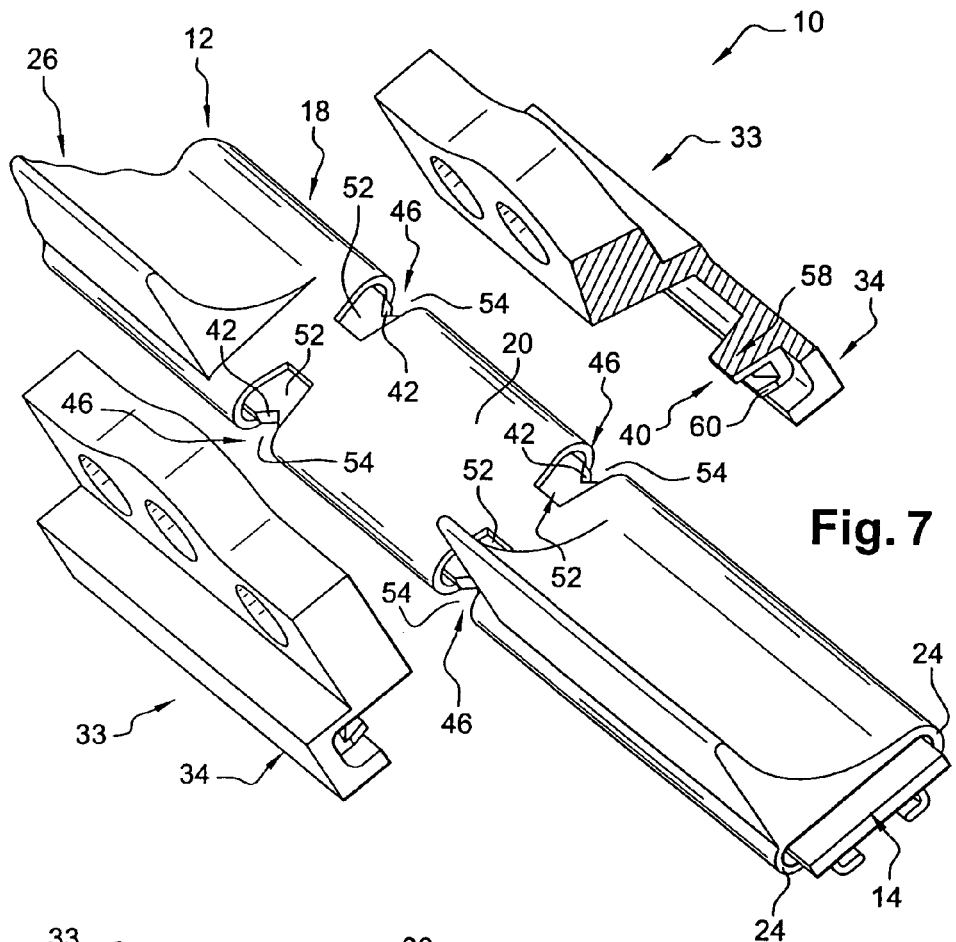
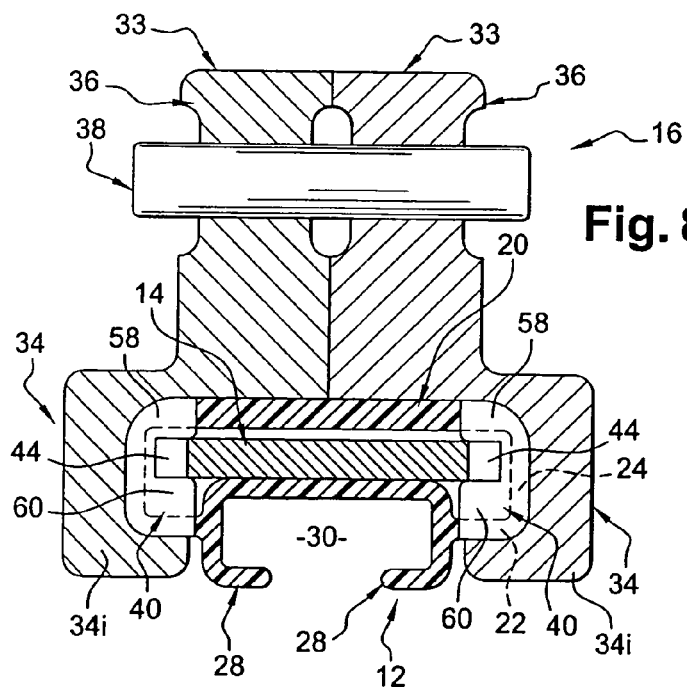
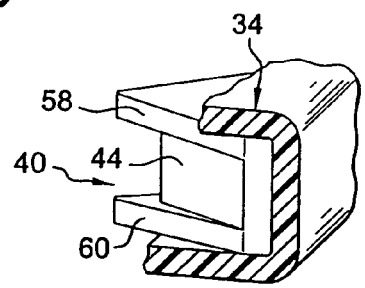

WINDSCREEN WIPER BLADE COMPRISING A SUPPORT FRAME, AN INNER SPINE AND A LINKING ELEMENT

The invention relates to a windscreen wiper blade for a motor vehicle of the flat-blade type, comprising an element for linking it with a drive arm, which provides the attachment of a structural element with a support frame.

The invention relates more particularly to a windscreen wiper blade for a motor vehicle, comprising
- a support frame with a longitudinal main orientation, which includes means for supporting a wiping strip and a tubular body with a longitudinal main axis;
- a structural element in the form of a longitudinal horizontal strip, which is accommodated inside the tubular body; and
- an element for linking the blade with a drive arm, which is installed on the support frame, and which comprises blocking means for blocking the structural element longitudinally in position in the tubular body.

According to one design that consists of manufacturing windscreen wiper blades with a low height, the articulated structure of the windscreen wiper blade, which supports the wiping blade or strip, is done away with, and the combination of a hollow support frame and a longitudinal rigidifying spine constitutes the actual structure of the blade.

The support frame is made up of a section with a longitudinal profile, which makes up a tubular body that is capable of accommodating the spine, which is in the form of a longitudinal horizontal strip. The frame finally comprises lower hooks for the installation of the wiping strip.

The spine is made from an elastic material, in order to allow the wiping strip to be pinned against the glass surface to be wiped.

The blade also comprises an element for linking the blade with the arm that drives it in a sweeping movement, which is mounted around the body of the support frame, and which comprises blocking means for blocking the longitudinal movement of the spine in its installed position inside the body of the support frame, Document U.S. Pat. No. 6,161,248 describes a windscreen wiper blade of the flat-blade type in which the linking element is connected to the spine by elastic tongues that are accommodated in complementary grooves of the spine.

However, as the windscreen wiper blade is used, the elastic tongues gradually and permanently deform, causing the assembly to develop a certain free play that reduces the efficiency of the windscreen wiper blade.

It is the object of the invention to provide a windscreen wiper blade for which the means of blocking the spine in installed position in the support frame are sufficiently rigid so as not to gradually deform, while making it possible to prevent any free play between the various elements of the windscreen wiper blade.

With this aim, the invention provides a windscreen wiper blade of the type described previously, characterised in that the means that block the linking element comprise lugs that cooperate with recesses made in the lateral edges of the structural element in order to ensure the blocking of the structural element in the tubular body.

According to further characteristics of the invention;
- the lugs are arranged on the lateral vertical longitudinal tabs of the linking element;
- each lug extends transversally towards the inside of the linking element, from an inner vertical longitudinal face of the associated lateral tab, and the free transversal end of each lug comprises a locking tooth that is accommodated in an associated recess of the structural element;
- each locking tooth performs the pressing of one part of one lateral wall of the tubular body against the bottom of the associated recess;
- during assembly, in order to make it possible to obtain a constant dimension between the two parts of the linking element when it is made in two parts, that is to say a constant width of the connector after assembly, and thus to make up for any differences that appear during the manufacturing of these two parts or semi-elements, the teeth are capable of becoming flattened in the recesses of the elastic structure;
  - the lateral walls and the top wall of the tubular body comprise a lateral opening that is situated opposite each recess of the structural element, and which the locking tooth of the associated lug passes through;
- the lateral opening is made by cutting the associated lateral wall and the top wall of the tubular body prior to the assembly of the linking element on the support frame;
- every lateral opening comprises a recess made in the top horizontal wall of the body, and the free transversal end of each lug comprises a top tooth that is accommodated in said recess, so as to position the linking element longitudinally in relation to the support frame;
- each recess and its associated top tooth are complementary in shape, overall trapezoidal, and can be, in particular, square, rectangular or even trapezoidal in shape (in the case of the pre-cut non-perforating version of the tubular body, the rectangular shape is preferably used);
- the lateral opening is made by cutting the associated lateral wall and the top and bottom horizontal walls of the tubular body during the assembly of the linking element on the support frame;
- the free transversal end of each lug comprises a top tooth located above the locking tooth, which is capable of partially cutting the associated lateral wall and the top horizontal wall of the tubular body, a bottom tooth, located below the locking tooth, which is capable of partially cutting the associated lateral wall and the bottom horizontal wall of the tubular body, and the locking tooth is capable of partially cutting the associated lateral wall, in order to perform the cutting of the opening when assembling the linking element on the support frame;
- the locking tooth is located transversally to the rear in relation to the top tooth and in relation to the bottom tooth;
- the top and bottom teeth are arranged vertically on either side of the structural element, so as to provide the vertical positioning of the structural element in relation to the linking element;
- the locking tooth, the top tooth and/or the bottom tooth are in the shape of a prism with a triangular horizontal section (in the case of the pre-cut version of the tubular body, the teeth are preferably cylindrical or even triangular in shape);
- each recess of the structural element has an overall triangular shape, complementing the associated locking tooth (cylindrical in the pre-cut version of the tubular element);
- each recess of the structural element comprises a first section with an overall rectangular shape made in the lateral edge of the structural element and a section with an overall triangular shape (cylindrical in the pre-cut version), complementing the associated locking tooth, made in the longitudinal bottom of the first section.

Further characteristics and advantages of the invention will become apparent from reading the following detailed description, for the understanding of which the appended figures can be consulted, in which:

FIG. 1 is a diagrammatic representation in an exploded perspective view of a windscreen wiper blade according to the invention FIG. 2 is a horizontal section view of the windscreen wiper blade shown in FIG. 1, before assembling the linking element;

FIG. 3 is a view similar to that shown in FIG. 2, in which the linking element is assembled on the support frame, showing the pressing of the vertical walls against the recesses;

FIG. 4 is a similar view to that shown in FIG. 2, showing another embodiment of the blade in which each vertical wall comprises a recess associated with each of the lugs FIG. 5 is a similar view to that shown in FIG. 3, showing a blade according to the embodiment shown in FIG. 4;

FIG. 6 is a similar view to that shown in FIG. 1, of a further embodiment of the blade according to the invention, according to which each lug comprises a top tooth and a bottom tooth and according to which the support frame comprises associated recesses FIG. 7 is a diagrammatic representation in top perspective view of the blade shown in FIG. 6, showing the shape of the top teeth of the lugs, and the shape of the associated recesses FIG. 8 is a vertical cross-section view of a blade according to another embodiment of the invention, according to which the top and bottom teeth perform the cutting of the walls of the tubular body FIG. 9 shows a perspective detail view of a lug shown in FIG. 8, showing the shape of the teeth.

For the description of the invention, the orientations vertical, longitudinal and transversal will be adopted non-limitingly according to the reference frame V, L, T indicated in the figures.

In the following description, identical, similar or analogous elements will be referred to using the same reference numbers.

FIG. 1 shows a windscreen wiper 10 of the flat-blade type, which comprises a support frame 12 with a longitudinal main orientation, which supports the other components of the blade, an internal spine 14 in the form of a longitudinal horizontal strip, a linking element 16 that makes it possible to link the windscreen wiper blade 10 to a drive arm (not shown) and a wiping strip (not shown).

The frame 12 comprises a central tubular body 18 with a longitudinal main axis, which is delimited by a top horizontal wall 20, a bottom horizontal wall 22, and by two lateral vertical longitudinal walls 24.

This delimitation of the tubular body 18 is obviously non-limiting. It is indeed possible to have a tubular body with a circular or elliptic cross-section since this body is capable of accommodating a spine 14, regardless of its shape.

The frame 12 also comprises a longitudinal upper rib 26, which extends vertically upwards from the top face of the top horizontal wall 20 of the body 18, which has an aerodynamic shape in order to generate the efforts that pin the blade 10 against the window surface under the action of the relative wind produced by the movement of the vehicle.

Finally, the support frame 12 includes bottom means for the assembly of the wiping strip, which in this case consist of lower longitudinal hooks 28 placed opposite each other and which delimit a tubular body 30 that is open towards the bottom, in which a top spine that complements the strip is inserted.

The spine 14 makes up the structural element of the blade 10, which rigidities the frame 12. The spine 14 is made from a relatively rigid material, for example, steel, and it consists of a longitudinal horizontal strip which is arranged inside the tubular body 18.

The linking element 16 is mounted overall longitudinally at the middle of the frame 12, overlapping the body 18 of the frame 12, that is to say that it extends above the top horizontal wall 20 and on either side of the lateral walls 24.

The top rib 26 comprises an opening 32 through which said linking element 16 is mounted on the frame 12.

The linking element 16 is made up of two parts 33 which are symmetrical in relation to a median vertical longitudinal plane of the blade 10, and which are assembled on the body 18 following a transversal movement.

Each part 33 of the linking element 16 comprises a top base 36, which is resting against the top face of the top horizontal wall 20 of the body 18, and which comprises means 38 for attaching it to the top base 36 of the other part 33 of the linking element 16.

The linking element 16 also comprises two bottom lateral tabs 34, each of which extends towards the bottom from the top base 36 of the associated part 33, and which are distributed transversally on either side of the body 18 of the frame 12, such as to provide the transversal positioning of the linking element 16 in relation to the body 18.

The bottom free end 34i of each lateral tab 34 is bent back towards the inside of the linking element 16, forming a hook that rests against the bottom face 22i of the bottom horizontal wall 22 of the body 18. The bottom end 34i of each lateral tab 34 thus makes it possible to provide the vertical blocking of the linking element 16 in its position when installed around the body 18.

Finally, the linking element 16 comprises blocking means that provide the longitudinal blocking of the spine 14 in its position when installed inside the hollow body 18 of the support frame 12.

The blocking means of the linking element 16 comprise internal transversal lugs 40 that cooperate with recesses 42 of the spine 14 to provide the blocking of the spine 14 in its position when installed in the body 18 of the frame.

These lugs are arranged on the lateral tabs 34.

The recesses 42 that accommodate the lugs 40 are made in the lateral edges 14a of the spine 14 and, according to one embodiment of the invention, the shape of the recesses 42 complements the shape of the lugs 40.

In this case, each lateral tab 34 comprises two lugs 40 and each lateral edge 14a of the spine 14 therefore comprises two recesses 42.

Each lug 40 extends transversally towards the inside of the linking element 16, from an internal vertical longitudinal face 34a of the associated lateral tab 34, and its inner free end comprises a first locking tooth 44, which is accommodated in the associated recess 42 of the spine 14.

FIGS. 2 and 3 show a first embodiment of the lugs 40 and the recesses 42, according to which each lateral wall 24 of the body 18 is partially pressed against the bottom of the associated recesses 42 by the locking teeth 44.

This pressing of the lateral wall 24 makes it possible, by elastic or plastic deformation of the lateral wall 24, to obtain direct attachment of the spine 14 that does not require any modification of the support frame 12, which greatly reduces the manufacturing cost of the support frame 12 and thus of the windscreen wiper blade 10.

FIGS. 4 and 5 show another embodiment of the invention according to which the lateral walls 24 and the top horizontal wall 20 of the body 18 comprise a lateral opening 46 located opposite each recess 42, and which a locking tooth 44 associated with the linking element 16 passes through.

This lateral opening 46 is made prior to the assembly of the linking element 16 on the frame 12, either when moulding the frame 12 or by cutting it.

Each locking tooth 44 is thus accommodated in the bottom of the associated recess 42, thereby improving the longitudinal blocking of the spine 14 in relation to the linking element 16.

However, the width of each opening 46 is determined so that the associated locking tooth 44 always performs the pressing of the associated lateral wall 24 against the bottom of the recess 42.

According to this embodiment, each recess 42 of the spine is made up of two parts, a first section 48 which is made in the lateral edge of the spine, and a second section 50, which is made in the bottom of the first section 48.

Furthermore, the first section 48 is longitudinally flared in relation to the second section, so as to receive the part of the lateral wall 24 of the body that is pressed against it by the locking tooth 44.

The support frame 12 is made from a plastic material that can be easily moulded or extruded. However, it is possible for the material used to be unsuitable for deformation by the teeth 44, which can locally reduce the mechanical strength of the frame 12.

FIGS. 6 and 7 show another embodiment of the lateral openings 46 which make it possible to position the linking element 16 longitudinally in relation to the support frame 12 during its assembly.

The lateral opening 46 thus comprises a first top recess 52 that extends transversally towards the inside of the frame 12, a second intermediate recess 54 made in the lateral wall 24 and a bottom recess 56 made in the bottom horizontal wall 22.

Each lug 40 of the linking element 16 comprises a top tooth 58 which is arranged above the locking tooth 44, and which is accommodated in the top recess 52 and a lower tooth 60 which is arranged below the locking tooth 44, and which is accommodated in the bottom recess 56.

The top tooth 58 and the bottom tooth 60 respectively complement the top recess 52 and the bottom recess 60, which makes it possible to ensure that the linking element 16 is positioned in its installed position on the support frame 12 with no free play.

In this case, as can be seen in FIG. 7, the top recess 52 and the complementary top tooth are overall trapezoidal in shape and, according to a preferred embodiment, they form an isosceles trapezoid.

In addition, the locking tooth 44 extends transversally to the rear in relation to the top tooth 58 and in relation to the bottom tooth 60.

The lateral edge 14a of the spine 14 is thus accommodated between the top 58 and bottom 60 teeth, thereby providing the vertical positioning of the spine 14 inside the body 18, in particular such as to hold the spine 14 in horizontal position.

According to this embodiment, the lateral openings 46 are made prior to the assembly of the blade 10, in other words prior to the assembly of the spine 14 and of the linking element 16.

An extra step of cutting the support frame 12 or of modifying the shape of the moulds used is therefore required to create the lateral openings 46.

FIGS. 8 and 9 show another embodiment of the lugs 40 in which the creation of the lateral openings 46, that is to say the cutting of the upper 52, intermediate 54 and lower 56 recesses, takes place during the assembly of the linking element 16 on the support frame 12.

For this purpose, the locking tooth 44 and the top 58 and bottom 60 teeth are each capable of partially cutting the top horizontal wall 20, the bottom horizontal wall 22 and the lateral wall 24 located opposite them.

For this purpose, each of the teeth 44, 58, 60 is pointed, in this case in the shape of a prism with a triangular horizontal section, and is capable of cutting the wall of the body 18, in the manner of a die.

Also in this case, the locking tooth 44 is positioned transversally towards the rear in relation to the teeth, so that the top 58 and bottom 60 teeth ensure the vertical positioning of the spine 14 inside the body 18.

The invention claimed is:

1. A windscreen wiper of a motor vehicle, comprising:
a support frame with a longitudinal main orientation comprising means for supporting a wiping strip and a tubular body with a longitudinal main axis;
a structural element in a form of a longitudinal horizontal strip, which is accommodated inside the tubular body; and
a linking element for linking a wiper blade of the windscreen wiper with a drive arm, which is installed on the support frame, and which comprises blocking means for blocking the structural element longitudinally in position in the tubular body,
wherein the blocking means of the linking element comprise lugs that cooperate with recesses made in the lateral edges of the structural element, in order to ensure the blocking of the structural element in the tubular body,
wherein the tubular body is delimited by a top horizontal wall, a bottom horizontal wall and two lateral vertical longitudinal walls, wherein the linking element is installed on the support frame by means of two lateral vertical longitudinal tabs that extend on either side of the lateral walls of the tubular body, and wherein the lugs are arranged on the lateral tabs.

2. The windscreen wiper blade according to claim 1, wherein the lateral walls and the top wall of the tubular body comprise a lateral opening which is located opposite each recess of the structural element, and which a locking tooth of the associated lug passes through.

3. The windscreen wiper blade according to claim 2, wherein the lateral opening is made by cutting the associated lateral wall and the top wall of the tubular body, prior to the assembly of the linking element on the support frame.

4. The windscreen wiper blade according to claim 3, wherein each lateral opening comprises a recess made in the top horizontal wall of the body, and in that the free transversal end of each lug comprises a top tooth which is accommodated in said recess, so as to position the linking element longitudinally in relation to the support frame.

5. The windscreen wiper blade according to claim 4, wherein each recess and its associated top tooth have complementary shapes, overall trapezoidal.

6. The windscreen wiper blade according to claim 2, wherein the lateral opening is made by cutting the associated lateral wall and the top and bottom horizontal walls of the tubular body, during the assembly of the linking element on the support frame.

7. The windscreen wiper blade according to claim 6, wherein the free transversal end of each lug comprises a top tooth located above the locking tooth, which is capable of partially cutting the associated lateral wall and the top horizontal wall of the tubular body, a bottom tooth, located below the locking tooth, which is capable of partially cutting the associated lateral wall and the bottom horizontal wall of the tubular body, and wherein the locking tooth is capable of partially cutting the associated lateral wall, to perform the cutting of the opening during the assembly of the linking element on the support frame.

8. The windscreen wiper blade according to claim 7, wherein the locking tooth is located transversally towards the rear in relation to the top tooth and in relation to the bottom tooth.

9. The windscreen wiper blade according to claim 8, wherein the top and bottom teeth are arranged vertically on either side of the structural element, so as to ensure the vertical positioning of the structural element in relation to the linking element.

10. The windscreen wiper blade according to claim 7, the top and bottom teeth are arranged vertically on either side of the structural element, so as to ensure the vertical positioning of the structural element in relation to the linking element.

11. The windscreen wiper blade according to claim 6, wherein the locking tooth, the top tooth and/or the bottom tooth are in the shape of a prism with a triangular horizontal section.

12. The windscreen wiper blade according to claim 11, wherein each recess of the structural element has an overall triangular shape that complements the associated locking tooth.

13. A windscreen wiper of a motor vehicle, comprising:
 a support frame with a longitudinal main orientation comprising means for supporting a wiping strip and a tubular body with a longitudinal main axis;
 a structural element in a form of a longitudinal horizontal strip, which is accommodated inside the tubular body; and
 a linking element for linking a wiper blade of the windscreen wiper with a drive arm, which is installed on the support frame, and which comprises blocking means for blocking the structural element longitudinally in position in the tubular body,
 wherein the blocking means of the linking element comprise lugs that cooperate with recesses made in the lateral edges of the structural element, in order to ensure the blocking of the structural element in the tubular body,
 wherein each lug extends transversally towards the inside of the linking element, from an internal vertical longitudinal face of an associated lateral tab, and wherein a free transversal end of each lug comprises a locking tooth which is accommodated in a recess associated with the structural element.

14. The windscreen wiper blade according to claim 13, wherein each locking tooth performs the pressing of one part of one lateral wall of the tubular body against the bottom of the associated recess.

15. The windscreen wiper blade according to claim 14, wherein lateral walls and a top wall of the tubular body comprise a lateral opening which is located opposite each recess of the structural element, and which the locking tooth of the associated lug passes through.

16. The windscreen wiper blade according to claim 13, wherein each recess of the structural element comprises a first section with an overall rectangular shape made in the lateral edge of the structural element and a section with an overall triangular shape that complements the associated locking tooth made in the longitudinal bottom of the first section.

\* \* \* \* \*